United States Patent
Kashem et al.

(10) Patent No.: US 12,437,827 B2
(45) Date of Patent: Oct. 7, 2025

(54) DRAM SPECIFIC INTERFACE CALIBRATION VIA PROGRAMMABLE TRAINING SEQUENCES

(71) Applicant: Advanced Micro Devices, Inc., Santa Clara, CA (US)

(72) Inventors: Anwar Kashem, Boxborough, MA (US); Craig Daniel Eaton, Austin, TX (US); Pouya Najafi Ashtiani, Munich (DE)

(73) Assignee: Advanced Micro Devices, Inc., Santa Clara, CA (US)

( * ) Notice: Subject to any disclaimer, the term of this patent is extended or adjusted under 35 U.S.C. 154(b) by 76 days.

(21) Appl. No.: 17/564,327

(22) Filed: Dec. 29, 2021

(65) Prior Publication Data
US 2023/0207038 A1    Jun. 29, 2023

(51) Int. Cl.
| *G11C 29/42* | (2006.01) |
| *G11C 29/12* | (2006.01) |
| *G11C 29/36* | (2006.01) |
| *G11C 29/44* | (2006.01) |

(52) U.S. Cl.
CPC .......... *G11C 29/42* (2013.01); *G11C 29/1201* (2013.01); *G11C 29/36* (2013.01); *G11C 29/4401* (2013.01)

(58) Field of Classification Search
CPC ..... G11C 29/42; G11C 16/26; G11C 16/3404; G11C 11/5642; G11C 29/1201; G11C 29/36; G11C 29/4401
USPC ........................................................ 714/764
See application file for complete search history.

(56) References Cited

U.S. PATENT DOCUMENTS

| 9,639,495 | B2 | 5/2017 | Dearth et al. |
| 2005/0099852 | A1* | 5/2005 | Chang .................. G11C 7/1057 365/189.11 |
| 2013/0055039 | A1* | 2/2013 | Dearth ................. G11C 29/028 708/251 |
| 2016/0328156 | A1* | 11/2016 | Swarbrick ........... G06F 13/4234 |
| 2017/0162276 | A1* | 6/2017 | Ok ......................... G11C 29/36 |

(Continued)

FOREIGN PATENT DOCUMENTS

| KR | 10-2020-0108772 A | 9/2020 |
| WO | 2015-200338 A1 | 12/2015 |

OTHER PUBLICATIONS

Kwanyeob Chae et al., Digital PHY Desing Methodologies for High-Speed and Low-Power Memory Interface; 2018 International SoC Design Conference (ISOCC), pp. 140-141; Nov. 12, 2018 [retrieved on Apr. 10, 2023] from <https://ieeexplore.ieee.org/abstract/document/8649918> pp. 140-141; and figures 1-7.

*Primary Examiner* — James C Kerveros
(74) *Attorney, Agent, or Firm* — Volpe Koenig (57) ABSTRACT

Methods and systems are disclosed for training, by a sequencer of a memory interface system, an interface with DRAM. Techniques disclosed comprise scheduling a command sequence, including DRAM commands that are interleaved with one or more CSR commands; executing the scheduled command sequence, wherein the DRAM commands are sent to the DRAM through an internal datapath of the system and the CSR commands are sent to the internal datapath; and training the interface based on exchange of data, carried out by the DRAM commands, including adjustments to an operational parameter associated with the interface.

20 Claims, 5 Drawing Sheets

(56) References Cited

U.S. PATENT DOCUMENTS

2018/0189201 A1 7/2018 Iyer et al.
2019/0287638 A1 9/2019 Fung et al.

\* cited by examiner

DRAM COMMAND ENCODING 410

| 31 | 30 | 29 | 28 | 27 | 26 | 25 | 24 | 23 | 22 | 21 | 20 | 19 | 18 | 17 | 16 | 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|---|---|---|---|---|---|---|---|---|---|---|---|---|---|---|---|
| MBZ | CSReg0 | | | MPE | WPE | RPE | AG | BG | BGG | TER | CU | Dly | | | | | | | | | | | RptCnt | | | | | LT | | OType=0 | |
| 63 | 62 | 61 | 60 | 59 | 58 | 57 | 56 | 55 | 54 | 53 | 52 | 51 | 50 | 49 | 48 | 47 | 46 | 45 | 44 | 43 | 42 | 41 | 40 | 39 | 38 | 37 | 36 | 35 | 34 | 33 | 32 |
| CSReg1 | | | | | | | | | | | | RAW DRAM Cmd (27:0) | | | | | | | | | | | | | | | | | | | MBZ |

CSR COMMAND ENCODING 420

| 31 | 30 | 29 | 28 | 27 | 26 | 25 | 24 | 23 | 22 | 21 | 20 | 19 | 18 | 17 | 16 | 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|---|---|---|---|---|---|---|---|---|---|---|---|---|---|---|---|
| | | | | CSRAddr | | | | | | TER | CU | Dly | | | | | | | | | | | RptCnt | | | | | LT | | OType=1 | |
| 63 | 62 | 61 | 60 | 59 | 58 | 57 | 56 | 55 | 54 | 53 | 52 | 51 | 50 | 49 | 48 | 47 | 46 | 45 | 44 | 43 | 42 | 41 | 40 | 39 | 38 | 37 | 36 | 35 | 34 | 33 | 32 |
| MBZ | | | | | | | | | WrDat | | | | | | | | | | | | | | CSRAddr | | | | | | | | |

MISC COMMAND ENCODING 430

| 31 | 30 | 29 | 28 | 27 | 26 | 25 | 24 | 23 | 22 | 21 | 20 | 19 | 18 | 17 | 16 | 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|---|---|---|---|---|---|---|---|---|---|---|---|---|---|---|---|
| MBZ | | | | Function | | | | | | TER | CU | Dly | | | | | | | | | | | RptCnt | | | | | LT | | OType=2 | |
| 63 | 62 | 61 | 60 | 59 | 58 | 57 | 56 | 55 | 54 | 53 | 52 | 51 | 50 | 49 | 48 | 47 | 46 | 45 | 44 | 43 | 42 | 41 | 40 | 39 | 38 | 37 | 36 | 35 | 34 | 33 | 32 |
| Payload(31:0) | | | | | | | | | | | | | | | | | | | | | | | | | | | | | | | |

DRAM SPECIFIC INTERFACE CALIBRATION VIA PROGRAMMABLE TRAINING SEQUENCES

BACKGROUND

Processing units rely on memory devices to store data and instructions used during operations. Access to memory devices, for example dynamic random-access memory (DRAM), is controlled by a memory physical layer, namely a memory interface (or PHY). Due to variations in the computing environments and in the manufacturing (associated with a DRAM, the processing unit that accesses the DRAM, and the communication link between them), operational parameters that control circuitry in datapaths to and from the DRAM need to be periodically calibrated. Such calibration is performed through training of the memory interface to the DRAM.

BRIEF DESCRIPTION OF THE DRAWINGS

A more detailed understanding may be had from the following description, given by way of example in conjunction with the accompanying drawings wherein.

DETAILED DESCRIPTION

DRAM usage involves sending signals between the DRAM and the memory interface at specified timings and voltage levels. To reliably interface with the DRAM, tuning voltage offsets and relative arrival times of signals with respect to each pin on the DRAM is required. Such tunings are done to compensate for differences in trace length between pins on the accessing processing unit and pins on the DRAM and to compensate for manufacturing variation in the DRAM and the accessing processing unit. Thus, the searching space for the correct values of voltage offsets and timing delays for each pin of the DRAM is large given the number of pins (e.g., 144) and the number of possible values (e.g., 256) for voltage offsets and timing delays. Assumptions with respect to manufacturing ranges and tolerances may limit the searching space so that simpler training algorithms may be implemented by a smaller number of hardware components.

However, modern DRAM technologies and the diverse computing environments in which these DRAMs operate do not allow for simplifying assumption, and, so, thorough training should take place to secure high performance. Further, there is a user expectation that a device (e.g., a laptop or any other mobile device) will boot or will initialize almost immediately. Additionally, training is often required to be done periodically as the computing environment changes. Therefore, training operations are limited to a time budget. Hence, given the diversity in DRAM technologies and computing environments and given constraints on training time, training algorithms that are flexible, robust, and efficient, should be designed.

Systems and methods are provided for programmable and accelerated training of datapaths residing in a memory interface system and DRAM connected thereto. Systems include a sequencer that orchestrates the training operation, implemented in programmable firmware. The sequencer is configured to schedule DRAM commands inline with other system commands, such as CSR commands and MISC commands. The DRAM commands are sent to the DRAM, via the system datapath. The system commands are sent to various registers of the memory interface system during and in coordination with the training operation. The DRAM commands may contain arbitrary bits (consistent or not consistent with valid DRAM commands) used to perform training under different levels of stress. The sequencer may be integrated with accelerated units that generate DRAM specific commands, supporting DRAM technologies such as DDR1-6, LPDDR4-6, GDDR7, and HBM3.

Aspects disclosed in the present application describe methods for training, by a sequencer of a memory interface system, an interface with DRAM. The methods comprise scheduling a command sequence, including DRAM commands and CSR commands. The scheduled command sequence is then executed, where the DRAM commands are sent to the DRAM through an internal datapath of the system and the CSR commands are sent to the internal datapath. The methods further comprise training the interface based on exchange of data, carried out by the DRAM commands. The training includes adjustments to an operational parameter associated with the interface.

Aspects disclosed in the present application also describe a sequencer of a memory interface system for training an interface with a DRAM. The system comprises at least one processor and memory storing instructions. The instructions, when executed by the at least one processor, cause the processor to schedule a command sequence, including DRAM commands and CSR commands, to execute the scheduled command sequence, wherein the DRAM commands are sent to the DRAM through an internal datapath of the system and the CSR commands are sent to the internal datapath, and to train the interface based on exchange of data, carried out by the DRAM commands. The training includes adjustments to an operational parameter associated with the interface.

Further, aspects disclosed in the present application describe a non-transitory computer-readable medium comprising instructions executable by at least one processor to perform methods for training, by a sequencer of a memory interface system, an interface with a DRAM. The methods comprise scheduling a command sequence, including DRAM commands and CSR commands. The scheduled command sequence is then executed, where the DRAM commands are sent to the DRAM through an internal datapath of the system and the CSR commands are sent to the internal datapath. The methods further comprise training the interface based on exchange of data, carried out by the DRAM commands. The training includes adjustments to an operational parameter associated with the interface.

Figure 1:
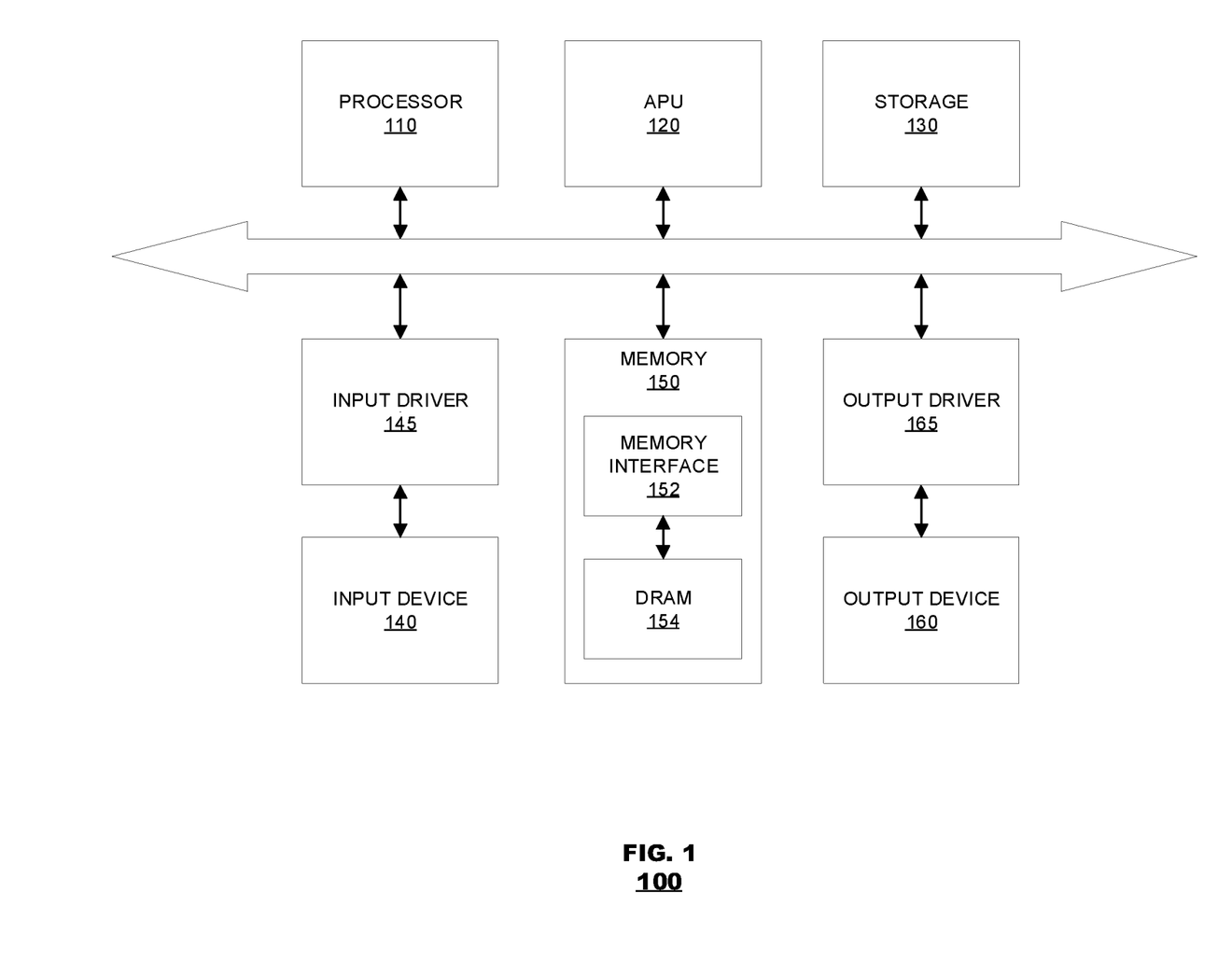
FIG. 1 is a block diagram of an example device, based on which one or more features of the disclosure can be implemented.

FIG. 1 is a block diagram of an example device 100, based on which one or more features of the disclosure can be implemented. The device 100 can be, for example, a computer, a gaming device, a handheld device, a set-top box, a television, a mobile phone, or a tablet computer. The device 100 can include a processor 110, an accelerated processing unit (APU) 120, storage 130, an input device 140, memory 150, and an output device 160. The device 100 can also include an input driver 145 and an output driver 165. The processor 110 and the APU 120 can represent one or more cores of central processing units (CPUs) and one or more cores of APUs, respectively. The processor 110, the APU 120, and the memory 150, or a subset thereof, may be located on the same die or on separate dies. In an aspect, the device 100 can include additional components not shown in FIG. 1.

The APU 120 can represent a graphics processing unit (GPU), that is, a shader system comprising one or more parallel processing units that are configured to perform computations, for example, in accordance with a single instruction multiple data (SIMD) paradigm. The APU 120 can be configured to accept compute commands and graphics rendering commands from the processor 110, to process those compute and graphics rendering commands, and/or to provide output to a display (the output device 160).

The storage 130 can include fixed or removable storage, for example, a hard disk drive, a solid-state drive, an optical disk, or a flash drive. The input device 140 can represent, for example, a keyboard, a keypad, a touch screen, a touch pad, a detector, a microphone, an accelerometer, a gyroscope, a biometric scanner, or a network connection (e.g., a wireless local area network card for receipt of wireless IEEE 802 signals). The output device 160 can represent, for example, a display, a speaker, a printer, a haptic feedback device, one or more lights, an antenna, or a network connection (e.g., a wireless local area network card for transmission of wireless IEEE 802 signals). In an aspect, the input driver 145 communicates with the processor 110 (or the APU 120) and the input device 140, and facilitates the receiving of input from the input device 140 to the processor 110 (or the APU 120). In another aspect, the output driver 165 communicates with the processor 110 (or the APU 120) and the output device 160, and facilitates the sending of output from the processor 110 (or the APU 120) to the output device 160.

The memory 150 can represent volatile or non-volatile memory, including random-access memory (RAM), static random-access memory (SRAM), dynamic random-access memory (DRAM), a cache, or a combination thereof. The memory 150 comprises a memory interface 152 that can facilitate access by the system components (e.g., the processor 110 or the APU 120) to DRAM 154. The memory interface 152 carries out operations, such as reading from, writing to, refreshing, and configuring the DRAM 154. The memory interface 152 also performs training based on which operational parameters of internal and external datapaths are set, as described herein.

Figure 2:
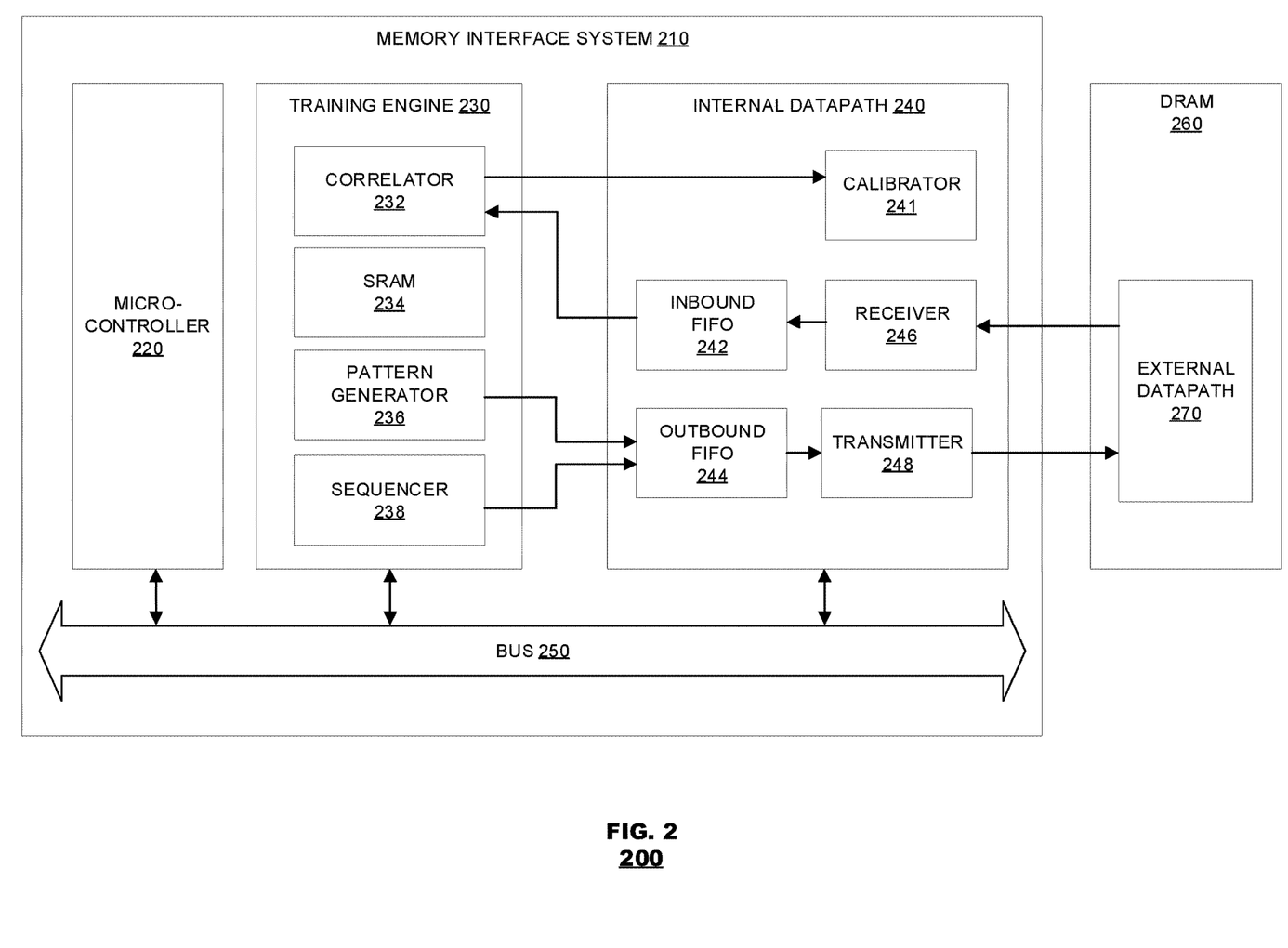
FIG. 2 is a block diagram of an example memory interface system, employable by the device of FIG. 1, based on which one or more features of the disclosure can be implemented.

FIG. 2 is a block diagram of an example memory system 200, employable by the device of FIG. 1, based on which one or more features of the disclosure can be implemented. The system 200 includes a memory interface system 210 (e.g., the memory interface 152 shown in FIG. 1), configured to access DRAM 260 (e.g., the DRAM 154 shown in FIG. 1). The DRAM 260 can represent various DRAM technologies, such as DDR1-6, LPDDR4-6, GDDR7, and HBM3. The memory interface system 210 includes a microcontroller 220, a training engine 230, and an internal datapath 240. The microcontroller 220, the training engine 230, and the internal datapath 240 are communicatively connected, directly and/or via the system's 210 internal bus 250. The system's 210 functions, as described herein, may be implemented by components of the microcontroller 220, the training engine 230, and the internal datapath 240, in hardware, firmware, software, or a combination thereof.

The microcontroller 220 is configured to initiate training operations, carried out by the training engine 230. The microcontroller 220 may initiate training operations and/or set the system's 210 state registers in response to signals sent by the host 100 (e.g., the processor 110 or the APU 120) or events, such as power up, clock frequency changes, power state transitions (e.g., between idle and active states), or periodically at a predetermined frequency.

The internal datapath 240 includes a calibrator 241, an inbound first-in-first-out (FIFO) stack 242 coupled to a receiver 246, and an outbound FIFO stack 244 coupled to a transmitter 248. The receiver 246 converts analog signals measured from the DRAM's 260 pins into discrete data that are then pushed into the inbound FIFO stack 242. The transmitter 248 converts discrete data popped out from the outbound FIFO 244 into analog signals that are fed into the DRAM's 260 pins. The operation of the internal datapath 240—including the receiver 246 circuitry (that employs analog-to-digital conversions) and the transmitter 248 circuitry (that employs digital-to-analog conversions)—can be controlled and tuned by various configuration registers (i.e., CSRs). Similarly, the DRAM includes a corresponding datapath (referred to herein as the external datapath) 270 that includes, for example, a receiver and a transmitter, that receive signals from and transmit signals to the transmitter 248 and the receiver 246, respectively, and that can be controlled and tuned by various configuration registers of the DRAM. During the training operation, carried out by the training engine 230, configuration registers of both the internal datapath 240 and the external datapath 270 are set (or calibrated), as disclosed herein.

The training engine 230 comprises components that carry out the training of the internal datapath 240 and the external datapath 270, including a sequencer 238, a pattern generator 236, SRAM 234, and a correlator 232. The training engine 230, as disclosed herein, can perform various programmable functionalities.

The sequencer 238 can be programmed to generate a sequence of commands employed in the training of the interface with DRAM 260 of various technologies (e.g., having different interface protocols). As disclosed herein, training of a memory interface involves adjustments made to operational parameters that control circuitry in the datapaths 240, 270, that is, calibration of configuration registers. The calibration of the configuration registers of the internal datapath 240 is carried out by CSR commands, and the calibration of the configuration registers of the external datapath 270 is carried out by DRAM commands. The calibration of these configuration registers is done in an iterative process (i.e., training) in which, for example, the disparity between data patterns that are read from the DRAM and reference data patterns is minimized. To perform a training operation, the sequencer 238 generates a training command sequence, including DRAM commands interleaved with system commands, such as CSR commands and MISC commands, as further described in reference to FIGS. 3 and 4. The sequencer 238 then executes the training command sequence and coordinates the training operation, sending signals to other system components, such as the correlator 232 and the pattern generator 236, to perform their respective functions. In an aspect, the sequencer 238 may contain many independent sequences for different training phases and may be dynamically reprogrammed.

The pattern generator 236 is configured to generate data patterns to be used as reference data patterns by the training operation. For example, a training operation may be employed that calibrates configuration registers that control the writing into a DRAM 260. In this case, a command sequence, generated by the sequencer 238, may include commands to write a data pattern, generated by the pattern generator 236, into specified locations in the DRAM 260 and commands to read back the written data pattern from the specified locations in the DRAM 260. Then, the read data pattern can be compared with the written data pattern, and, based on this comparison, error statistics may be determined. The determined error statistics can then be used to calibrate the configuration registers—that is, to tune the control variables of the internal datapath 240 and the external datapath 270 through which the written data pattern is transmitted, as discussed in detail below.

The SRAM 234 may be used to store training sequences or data patterns that, for example, were previously generated by the sequencer 238 or the pattern generator 236, respectively. Stored training sequences and data patterns may be used when the system 100 is booting up or for periodic training. Having such training sequences and data patterns already resident in the SRAM 234 allows for faster (boot or periodic) training time.

The correlator 232 is configured to access reference data patterns (e.g., generated by the pattern generator 236 and/or stored in the SRAM 234) and to compare these reference data patterns with corresponding data patterns that are read from the DRAM 260. For example, when the training is with respect to a writing operation, a reference data pattern may be a data pattern that was written to a location in the DRAM 260 and then read back from that location. In such a case, for example, the sequencer 238 may signal the pattern generator 236 to generate a reference data pattern (or to load a reference data pattern already generated and/or stored in the SRAM 234). The sequencer 238 may then encode commands that facilitate writing the reference data pattern into a location in the DRAM 260. The sequencer 238 may also encode commands that facilitate reading back the written data pattern from the DRAM 260. These DRAM commands and the data that are written are transmitted to the DRAM 260 via the outbound FIFO stack 244 and the transmitter 248. The data that are read are received via the receiver 246 and the inbound FIFO stack 242. Following the reading operation, the sequencer 238 may signal the correlator 232 to perform a comparison between the reference data pattern and the corresponding read data pattern. Based on the comparison, the correlator 232 can determine error statistics. The error statistics can be used to adjust operational parameters stored in respective configuration registers of the datapaths 240, 270.

During training, the sequencer 238 may iterate through a command sequence (e.g., including writing and/or reading operations), where each iteration can result in further adjustment of an operational parameter and convergence toward an optimal result (with favorable error statistics). However, if convergence is not achieved, error statistics across iterations can be collected and further analysis may be done to reach an optimal result for the operational parameter. In an aspect, to calibrate an operational parameter that is stored in a control register of the internal datapath 240, the correlator 232 may feed the calibrator 241 data associated with error statistics derived from one or more iterations through the command sequence. Based on that data, the calibrator 241 can adjust the operational parameter. However, to calibrate an operational parameter that is stored in a control register of the external datapath 270, the calibrator can signal the sequencer 238 with the adjustment value. In response, the sequencer 238 can send a DRAM command that accordingly adjusts the respective control register in the DRAM (e.g., Mode Register Write or Mode Register Read commands). In another aspect, the calibrator 241 may determine the quality of a signal measured from a DRAM pin during each iteration and use these measurements to adjust an operational parameter of either the internal datapath 240 or the external datapath 270. As mentioned above, data associated with error statistics and/or the quality of a signal may be collected across several training iterations and may be used by the system 210 for further analysis, based on which an optimal result for an operational parameter may be computed in case the iterative adjustments of the operational parameter do not converge.

A training sequence unit with respect to a writing operation that calibrates an operational parameter is demonstrated herein. The operational parameter may be a voltage offset that is stored in a write register used by a receiver in the external datapath 270. The training sequence unit may include the following commands. The first command in the sequence unit sets an initial voltage offset into the write register (Mode Register Write command). This first command is followed by several commands that activate a memory region in the DRAM 260 to be accessed (e.g., 4 Active commands that specify a bank group, a bank, a row, and a column in the DRAM 260). Next in the sequence unit are multiple writing commands, writing a reference data pattern into the activated region (e.g., 4000 Write commands), followed by multiple reading commands, reading back from the activated region (e.g., 4000 Read commands). Ending this sequence unit is a precharge command (needed after reading from a raw to restore the values read from respective DRAM's capacitors). This sequence unit may be executed in several iterations. In each iteration, an error statistic may be derived based on a comparison of the written data and the read back data. Based on the error statistics, a new (adjusted) value is computed for the reference voltage to be used in the next iteration of the sequence unit. Alternatively, the sequence unit may be repeated in a loop for a range of reference voltages. Error data for each loop may be collected based on the comparison of the reference data and the read data, and an optimal reference voltage may be computed based on statistics derived from the collected error data.

The above training with respect to a writing operation relies on a reading operation that properly works. Thus, prior to training with respect to a writing operation, training with respect to a reading operation should be performed. This can be done by first setting up the DRAM with a reference data pattern. This can be done by writing the reference pattern into the DRAM at a very slow speed or by using a reference data pattern that is already pre-programed into the DRAM. When using a DDR5, for example, a mode register command exists that allows for all readings from the DRAM to be read from an LFSR (linear feedback shift register) that can be set with a known value.

A training sequence unit with respect to a reading operation that calibrates an operational parameter is demonstrated herein. The operational parameter may be a voltage offset that is stored in a read register used by a transmitter in the external datapath 270. The training sequence unit may include the following commands. The first command in the sequence unit sets an initial voltage offset into the read register (Mode Register Read command). This first command is followed by several commands that activate a memory region in the DRAM 260 to be accessed (e.g., 4 Active commands that specify a bank group, a bank, a row, and a column in the DRAM 260). Next in the sequence unit are multiple reading commands, reading from the activated region a reference data pattern that, for example, had been previously written into the activated region at a slow speed (e.g., 4000 Read commands). As before, ending this sequence unit is a precharge command. This sequence unit may be executed in several iterations. In each iteration, an error statistic may be derived based on a comparison of the reference data and the read data. Based on the error statistics, a new (adjusted) value is computed for the reference voltage to be used in the next iteration of the sequence unit. Alternatively, the sequence unit may be repeated in a loop for a range of reference voltages. Error data for each loop may be collected based on the comparison of the reference data and the read data, and an optimal reference voltage may be computed based on statistics derived from the collected error data.

Figure 3:
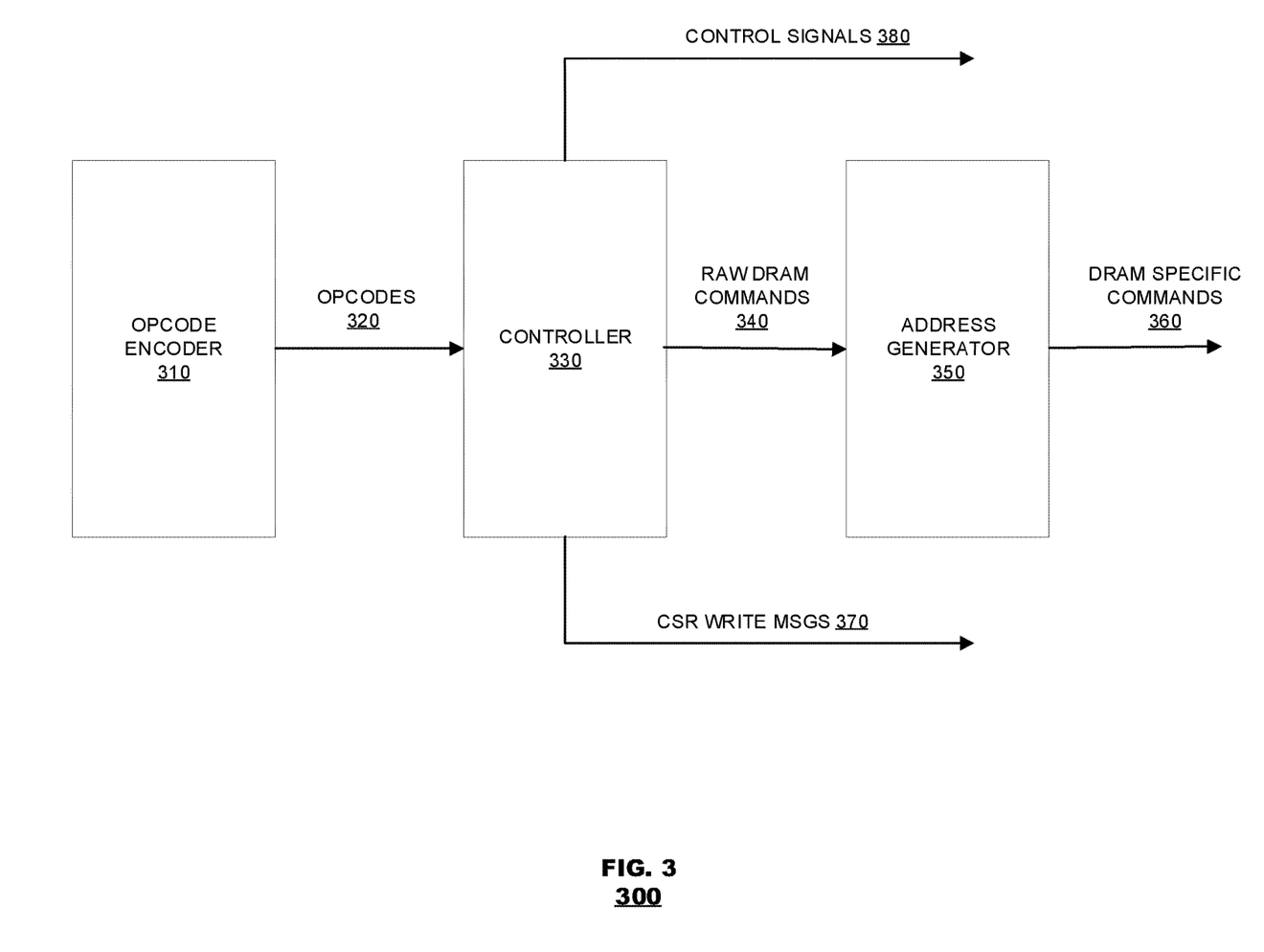
FIG. 3 is a block diagram of an example sequencer, based on which one or more features of the disclosure can be implemented.

FIG. 3 is a block diagram of an example sequencer 300, based on which one or more features of the disclosure can be implemented. The sequencer 300 (e.g., the sequencer 238 of FIG. 2) includes an opcode encoder 310, a controller 330, and an address generator 370. The opcode encoder 310 is configured to generate a sequence of opcodes 320, provided as input to the controller 330. Based on the sequence of opcodes 320, the controller 330 orchestrates the training operation.

The opcode encoder 310, when encoding the opcodes 320, can interleave different opcode types. That is, opcodes that encode DRAM commands can be interleaved with opcodes that encode system commands, such as CSR commands and/or MISC commands. This feature allows the controller to run a training operation continuously, without pausing for the microcontroller 220, for example, to reconfigure control registers in the internal datapath 240 or to reconfigure state (or mode) registers of other system components. The encoding 310 of opcodes 320, based on which a training sequence can be generated and a training operation can be executed by the controller 330, is described in detail in reference to FIG. 4.

Hence, the controller 330 receives from the opcode encoder 310 opcodes 320 that include interleaved commands, including DRAM commands, CSR commands, and MISC commands. The controller 330 uses the received interleaved opcodes 320 to orchestrates the training operation. Accordingly, based on opcodes that encode DRAM commands, the controller generates a training sequence of raw DRAM commands 340, enables reading/writing via the internal datapath 240, and sends control signals to other system components (such as, the pattern generator 236, the correlator 232, or the calibrator 241). Based on opcodes that encode CSR commands, the controller generates CSR Write messages 370 and sends these messages (via the bus 250) to respective configuration registers in the internal datapath 240. Based on opcodes that encode MISC commands, the controller may set the status registers of other system components (such as, the pattern generator 236, the correlator 232, or the calibrator 241). The address generator 370 translates (or reformats) the raw DRAM commands into DRAM specific commands 360.

Figure 4:
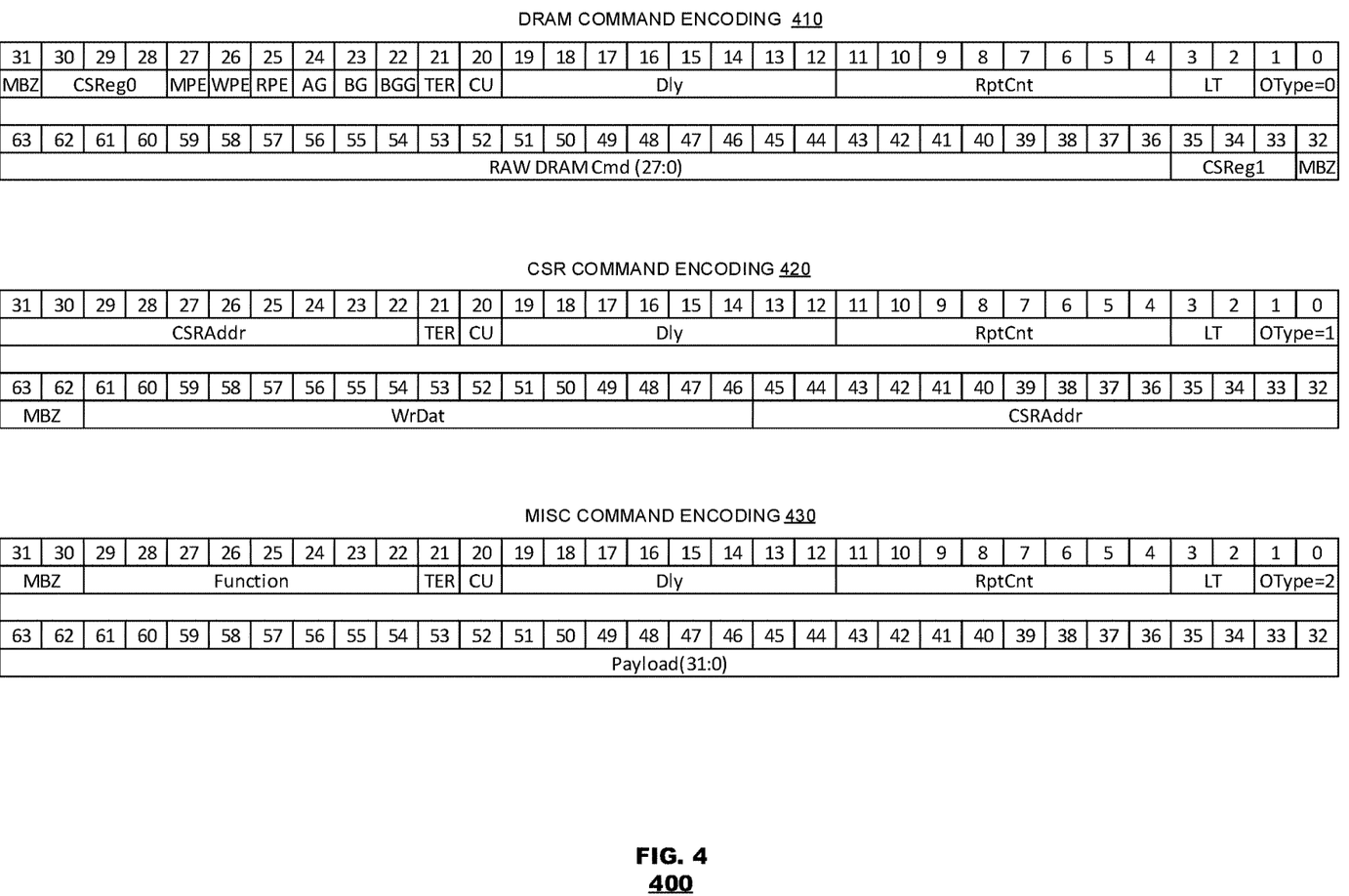
FIG. 4 is a diagram of an example operation code (opcode) for encoding DRAM commands, control and status register (CSR) commands, and miscellaneous (MISC) commands, based on which one or more features of the disclosure can be implemented.

FIG. 4 is a diagram of an example operation code 400 for encoding DRAM commands 410, CSR commands 420, and MISC commands 430, based on which one or more features of the disclosure can be implemented. The OType field (bits 0:1) indicates the type of command that is encoded by the opcode 400 (e.g., "0" for a DRAM command 410, "1" for a CSR command 420, or "2" for a MISC command 430). A command may be encoded, by the opcode encoder 310, to be applied iteratively in a loop, using the LT, RptCnt, and Dly fields of the opcode 400. The LT field (bits 2:3), the RptCnt (bits 4:11), and the Dly (bits 12-19) can be used to determine a loop type, the times a loop is executed, and the number of clock cycles in a gap between the execution of successive commands, respectively. The CU flag (bit 20), if on, triggers an update of circuitry in the internal datapath (e.g., DLL/DAC) 240 with values in the corresponding CSRs. The TER flag (bit 21), if on, triggers the end of execution of a sequence of commands, ending with the execution of the command encoded by this operation code. The MBZ (i.e., must be zero) fields in the opcodes 410, 420, 430 have to be set to zero (these fields are reserved for future use). Other fields in the operation code are defined as a function of the OType.

When the encoder 310 encodes a DRAM command (i.e., OType=0) 410, a generic version of the command is stored in the Raw DRAM Cmd (Bits 36:63). The raw DRAM Cmd may contain the values of raw address components. Generally, DRAM 260 are organized by groups of banks. Each bank within a bank group is further organized by rows, and each row is organized by columns. The bank group, bank, row, and column constitute the memory address components. However, the format in which these address components are packed into a DRAM command is DRAM technology dependent. Therefore, to generate an address in the required format, the raw address components might need to be reformatted (as further explained in reference to the address generator 370 of FIG. 3). To that end, the flags denoted BGG, BG, and AG (bits 22:24), if on, indicate that the raw addresses for the bank group, the bank, and the row and column, respectively, have to be reformatted. The Read pipe enable flag, denoted RPE (bit 25), if on, indicates that the DRAM reading pipeline should be enabled for one burst. The Write pipe enable flag, denoted WPE (bit 26), if on, indicates that the DRAM writing pipeline should be enabled for one burst. The Max read latency (MRL) pipeline enable flag, denoted MPE (bit 27), if on, indicates that the MRL pipeline should be triggered to pop one burst of data from the Inbound FIFO 242. Respective burst lengths are configurable via a CSR Command. The CSReg fields (bits 28-30 and 33-35) are multipurpose registers, for example, a CSReg field can be used to activate the chip-select pin in the DRAM.

When the opcode encoder 310 encodes an CSR command (i.e., OType=1) 420, that CSR command can be scheduled in-line with other DRAM commands. Such scheduling allows the controller 330 to generate a CSR write message at any location in a training sequence of DRAM commands in order to adjust the value of any of the configuration registers in the internal datapath 240. Thus, when encoding a CSR command 420, the CSRAddr field (bits 22-45) of the opcode 400 can be used to specify the address of a configuration register and the WrDat field (bits 46-61) of the opcode 400 can specify the data to be written to that configuration register.

When the opcode encoder 310 encodes a MISC command (i.e., OType=2) 430, that MISC command can be scheduled in-line with other DRAM commands. Such scheduling allows the controller 330 to respond to a MISC command at any location in a training sequence of DRAM commands. The controller 330 can respond to a MISC command 430, by generating control signals 380 to other system components (such as, the pattern generator 236, the correlator 232, or the calibrator 241) to set their status registers and to coordinate the training operation. When encoding a MISC command 430, the Function field (bits 22-29) can be used to define the function to be performed and the Payload field (bits 32-63) can be used to store data used by the function to be performed. For example, a function may be writing the content of the payload field into a state register accessible by one of the other system components. Or, the function may be setting an operational mode of the sequencer 238, 300 with the content of the payload. The latter allows the sequencer to change its mode of operation during execution of a training sequence.

The interleaving of DRAM commands with system commands, such as CSR and/or MISC commands, as described above, allows for tight scheduling of the training operation. For example, within each iteration of a training sequence unit, DRAM commands, in which writing and/or reading operations are performed, can be immediately followed by a CSR command in order to adjust an operational parameter based on the writing and/or reading operations before a following iteration of the sequence unit is performed. Likewise, dynamically changing the operation mode of the sequencer or state registers of other system components, via MISC commands, allows for faster and uninterrupted training operation. As a result, more training can be done in the same amount of time (e.g., 100 milliseconds), leading to more robust performance. Conventionally, the microcontroller 220 controls the modification of configuration registers and the changing of the sequencer's 238 operational modes. However, for the microcontroller 220 to perform these functions, the sequencer has to be paused. This puts constraints on, and slows down, the training operation that has to be executed in small chunks between pauses.

The Opcode encoder 310, in addition to encoding valid DRAM commands, can encode DRAM commands containing arbitrary bit patterns. For example, when training the address pins of the DRAM 260, these pins may be tested under high and low stress conditions. To that end, a chip-select pin in the DRAM may be utilized. The chip-select pin when deactivated results in a mode in which the DRAM ignores signals sent to its command address bus. The system 210 allows for the driving of different data on address pins during a sequence, where the DRAM chip transitions from de-active state, to active state, and back to de-active state. Thus, sending the same signals when the chip-select is deactivated, activated, and deactivated again, provides an opportunity for testing when the signals are in steady state (during the time the chip-select is activated), that is, testing in low stress conditions. On the other hand, sending different signals when the chip-select is deactivated, activated, and deactivated again, provides an opportunity for testing when the signals are not in a steady state (during the time the chip-select is activated), that is, testing in high stress conditions.

The controller 330 receives the opcodes 320 encoded by the opcode encoder 310 and coordinates a training operation based on these opcodes. When encountering an opcode that encodes a DRAM command 410, the controller extracts the raw DRAM Cmd (bits 36:63) and sends the raw DRAM command 340 to the address generator 350 to be reformatted into a DRAM specific command 360. The controller may repeat the command according to information encoded in the LT and RptCnt fields and send out the repeated command at time gaps specified by the Dly field. The controller may repeat commands in a nested loop, as follows:

```
INSTRUCTION 1 (RptCnt = 1)
LOOP_1 (loop1 count = 5)
   INSTRUCTION 2 (RptCnt = 1)
   LOOP_2 (loop2 count = 2)
      INSTRUCTION 3 (RptCnt = 1)
      INSTRUCTION 4 (RptCnt = 4)
   END_LOOP_2
END_LOOP_1
```

Accordingly, INSTRUCTION 1 is executed one time, INSTRUCTION 2 is executed five times, INSTRUCTION 3 is executed ten times, and INSTRUCTION 4 is executed 40 times.

When the opcode encodes a reading or a writing DRAM command, based on the RPE or the WPE flags, the controller enables the reading datapath 242, 246 or the writing datapath 244, 248, respectively. When encountering an opcode that encodes a CSR command 420, the controller generates a CSR Write message 370 that specifies the destination address of a configuration register, using the CSRaddr field, and the content to be written to that configuration register, using the WrDat filed. The controller sends the generated CSR Write message 370 via the bus 250 in-line with the other commands in the training sequence (e.g., at a time cycle right after a previous DRAM command has been sent). When encountering an opcode that encodes a MISC command 430, the controller performs the function indicated by the Function field. For example, the function may specify writing the content of the Payload field into a state register of another system component (such as, the pattern generator 236, the correlator 232, or the calibrator 241).

The address generator 350 is configured to translate a raw DRAM command 340 into a DRAM specific command 360. The address generator 350 comprises accelerated units that can each generate addresses according to a protocol specific to a DRAM technology, supporting DRAM technologies such as DDR1-7, LPDDR5, GDDR7, or HBM3. Manufactured based on different technologies, memory regions in DRAM are organized differently. That is, the size and number of the groups of banks, the banks within a bank group, the rows, and columns are different. And so, to access the same memory region, different values for the bank group, the bank, the row, and the column should be specified, in accordance with the DRAM specifications (or standards). Furthermore, each DRAM technology dedicates a different number of pins to a command, and different pin positions into which the bank group, the bank, the row, and the column data are to be fed. For example, in a DDR5 a command length is 14 bits. Thus, the 28 bits of a raw DRAM Cmd should be sent to the DRAM in two DRAM clock cycles. In another example, in LPDDR5 a command length is 7 bits. Thus, the 28 bits of a raw DRAM Cmd should be sent to the DRAM in four DRAM clock cycles. Thus, the address generator 350 has to map the 28 bits of a raw DRAM command 340 into a DRAM specific command format in accordance with the specific DRAM standard. That is, the raw values for the bank group, the bank, the row, and column should be translated and mapped to pin numbers and be sent in a command cycle as specified by the standard.

Figure 5:
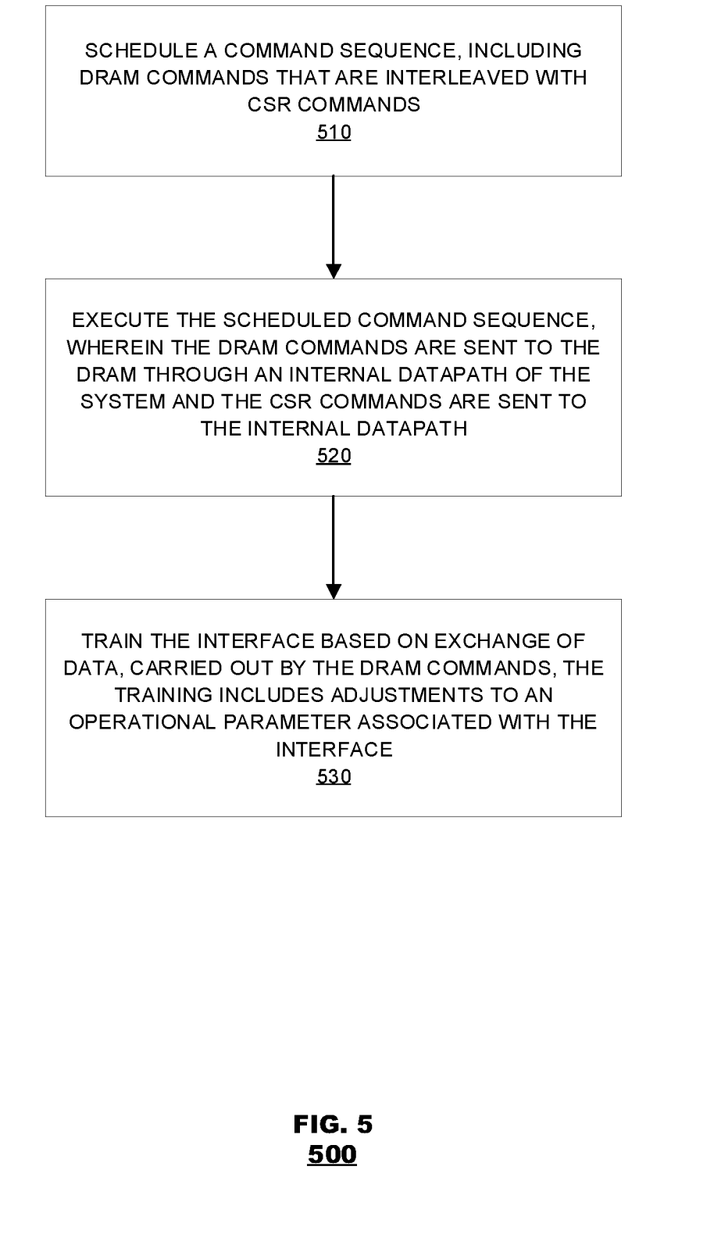
FIG. 5 is a flowchart of an example method for training of a memory interface system, based on which one or more features of the disclosure can be implemented.

FIG. 5 is a flowchart of an example method 500 for training of a memory interface system, based on which one or more features of the disclosure can be implemented. The method 500 can employ the sequencer 238, 300 of the memory interface system 210 to perform the following steps. In step 510, a command sequence is scheduled, including DRAM commands that are interleaved with CSR commands. Then, in step 520, the scheduled command sequence is executed. During execution, the DRAM commands are sent to the DRAM through an internal datapath of the system 210 and the CSR commands are sent to the internal datapath. In step 530, the interface is trained based on exchange of data carried out by the DRAM commands. The training includes adjustments to an operational parameter associated with the interface. The adjusted operational parameter may be associated with a configuration register of the internal datapath, in which case the adjustments are carried out by the CSR commands. The adjusted operational parameter may also be associated with a configuration register of an external datapath within the DRAM, in which case the adjustments are carried out by one or more of the DRAM commands. In an aspect, the scheduling of the command sequence, in step 510, can include interleaving one or more MISC commands with the DRAM commands and the CSR commands, and the execution of the scheduled command sequence, in step 520, can include setting a state register of the memory interface system 210 in response to one of the MISC commands.

It should be understood that many variations are possible based on the disclosure herein. Although features and elements are described above in particular combinations, each feature or element can be used alone without the other features and elements or in various combinations with or without other features and elements.

The methods provided can be implemented in a general-purpose computer, a processor, or a processor core. Suitable processors include, by way of example, a general-purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), and/or a state machine. Such processors can be manufactured by configuring a manufacturing process using the results of processed hardware description language (HDL) instructions and other intermediary data including netlists (such as instructions capable of being stored on a computer readable media). The results of such processing can be maskworks that are then used in semiconductor manufacturing processes to manufacture processors that implement aspects of the embodiments.

The methods or flow charts provided herein can be implemented in a computer program, software, or firmware incorporated in a non-transitory computer-readable storage medium for execution by a general-purpose computer or processor. Examples of non-transitory computer-readable storage (medium) include read only memory (ROM), random-access memory (RAM), a register, cache memory, semiconductor memory devices, magnetic media such as internal hard drive and disks and removable disks, magneto-optical media, and optical media such as CD-ROM disks, and digital versatile disks (DVDs).

What is claimed is:

1. A method for training, by a sequencer of a memory interface system, an interface with dynamic random-access memory (DRAM), comprising:
    scheduling a command sequence, including DRAM commands and control and status register (CSR) commands, at least one of the CSR commands configured to command a write of an operational parameter to a register of an internal datapath of the interface, the operational parameter comprising a voltage parameter of the internal datapath of the interface or a timing parameter of the internal datapath of the interface;
    executing the scheduled command sequence, wherein the DRAM commands are sent to the DRAM through the internal datapath of the interface and the CSR commands are written to the register of the internal datapath of the interface; and
    training the interface based on an exchange of data, carried out by the DRAM commands, the training including adjustments to the operational parameter.

2. The method of claim 1, wherein the DRAM commands and the CSR commands are interleaved.

3. The method of claim 1, wherein the operational parameter comprises a voltage offset or a timing offset.

4. The method of claim 1, wherein the DRAM commands are configured to write another operational parameter to a configuration register of an external datapath within the DRAM and wherein adjustments to the other operational parameter are carried out by one or more of the DRAM commands.

5. The method of claim 1, wherein the exchange of data comprises a data pattern read from the DRAM and the training of the interface comprises:
    computing error statistics based on a comparison between the read data pattern and a reference data pattern, and
    adjusting the operational parameter based on the error statistics.

6. The method of claim 1, wherein the exchange of data comprises a reference data pattern written into the DRAM and a data pattern read back from the DRAM and the training of the interface comprises:
    computing error statistics based on a comparison between the read data pattern and the reference data pattern, and
    adjusting the operational parameter based on the error statistics.

7. The method of claim 1, wherein:
    the scheduling of the command sequence further includes interleaving one or more miscellaneous (MISC) commands with the DRAM commands and the CSR commands, and
    the execution of the scheduled command sequence further includes, in response to one of the MISC commands, setting a state register of the memory interface system.

8. The method of claim 1, wherein one or more of the DRAM commands contain arbitrary bit patterns.

9. The method of claim 1, further comprising:
    generating the DRAM commands, wherein generating each of the DRAM commands includes encoding a raw DRAM command and reformatting the raw DRAM command into a DRAM specific command according to an interface protocol specific to the DRAM.

10. A sequencer of a memory interface system for training an interface with a dynamic random-access memory (DRAM), comprising:
    at least one processor; and
    memory storing instructions that, when executed by the at least one processor, cause the processor to:
    schedule a command sequence, including DRAM commands and control and status register (CSR) commands, at least one of the CSR commands configured to command a write of an operational parameter to a register of an internal datapath of the interface, the operational parameter comprising a voltage parameter of the internal datapath of the interface or a timing parameter of the internal datapath of the interface,
    execute the scheduled command sequence, wherein the DRAM commands are sent to the DRAM through the internal datapath of the interface and the CSR commands are written to the register of the internal datapath of the interface, and train the interface based on an exchange of data, carried out by the DRAM commands, the training including adjustments to the operational parameter.

11. The sequencer of claim 10, wherein the DRAM commands and the CSR commands are interleaved.

12. The sequencer of claim 10, wherein the operational parameter comprises a voltage offset or a timing offset.

13. The sequencer of claim 10, wherein the DRAM commands are configured to write another operational parameter to a configuration register of an external datapath within the DRAM and wherein adjustments to the other operational parameter are carried out by one or more of the DRAM commands.

14. The sequencer of claim 10, wherein the exchange of data comprises a data pattern read from the DRAM and the training of the interface comprises:

computing error statistics based on a comparison between the read data pattern and a reference data pattern, and adjusting the operational parameter based on the error statistics.

15. The sequencer of claim 10, wherein the exchange of data comprises a reference data pattern written into the DRAM and a data pattern read back from the DRAM and the training of the interface comprises:

computing error statistics based on a comparison between the read data pattern and the reference data pattern, and adjusting the operational parameter based on the error statistics.

16. The sequencer of claim 10, wherein:

the scheduling of the command sequence further includes interleaving one or more MISC commands with the DRAM commands and the CSR commands, and the execution of the scheduled command sequence further includes, in response to one of the MISC commands, setting a state register of the memory interface system.

17. The sequencer of claim 10, wherein one or more of the DRAM commands contain arbitrary bit patterns.

18. The sequencer of claim 10, wherein the instructions further cause the processor to:

generate the DRAM commands, wherein generating each of the DRAM commands includes encoding a raw DRAM command and reformatting the raw DRAM command into a DRAM specific command according to an interface protocol specific to the DRAM.

19. A non-transitory computer-readable medium comprising instructions executable by at least one processor to perform a method for training, by a sequencer of a memory interface system, an interface with a dynamic random-access memory (DRAM), the method comprising:

scheduling a command sequence, including DRAM commands that are interleaved with control and status register (CSR) commands, at least one of the CSR commands configured to command a write of an operational parameter to a register of an internal datapath of the interface, the operational parameter comprising a voltage parameter of the internal datapath of the interface or a timing parameter of the internal datapath of the interface;

executing the scheduled command sequence, wherein the DRAM commands are sent to the DRAM through the internal datapath of the interface and the CSR commands are written to the register of the internal datapath of the interface; and training the interface based on an exchange of data, carried out by the DRAM commands, the training including adjustments to the operational parameter.

20. The non-transitory computer-readable medium of claim 19, wherein the operational parameter comprises a voltage offset or a timing offset.

* * * * *